June 5, 1956 S. E. MAYER 2,749,488
LIGHT CELLS OR RECTIFIERS
Filed Aug. 18, 1954
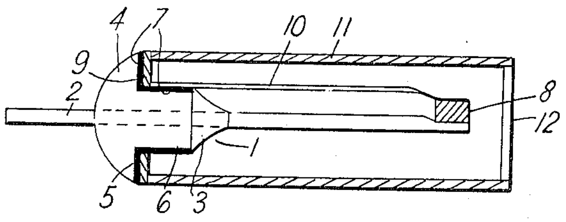
Inventor
S. E. MAYER
By Philip M. Bolton
Attorney United States Patent Office 2,749,488

Patented June 5, 1956

2,749,488

LIGHT CELLS OR RECTIFIERS

Simon Ernst Mayer, London, England, assignor to International Standard Electric Corporation, New York, N. Y., a corporation of Delaware Application August 18, 1954, Serial No. 450,713

Claims priority, application Great Britain August 28, 1953

3 Claims. (Cl. 317—234)

This invention relates to germanium junction type light cells and rectifiers.

It is known that a germanium P–N junction has rectifying properties, and also that it acts as an electrical valve in the reverse rectification direction, the valve opening in response to light and/or infra red rays impinging on the edge of the junction.

The object of the invention is to provide a crystal housing basically suitable for both a rectifier and a light cell.

The main feature of the invention comprises a germanium P–N junction type rectifier or light cell comprising a germanium P–N junction dice, soldered between parallel terminals carried by inner and outer metal members of a glass-metal seal and surrounded by an inert atmosphere contained within a cover soldered to the outer metal member of the glass-metal seal.

The invention will be described with reference to a preferred embodiment shown in side section in the accompanying drawing.

A crystal die is used having dimensions of the order of 0.2 cms. square and 0.1 cms. thick and containing a P–N junction parallel to its major surfaces: the major surfaces are tinned, but tinning may be preceded by electroplating with nickel-tin followed by a heat treatment in the manner described in specification No. 15,391/53 (S. E. Mayer 11).

A glass-metal seal 1 is the basis of the construction: it comprises a central Kovar lead 2 in a glass seal 3 having a domed end 4 joined by an annular shoulder 5 to a cylindrical portion 6 carrying a flanged Kovar sleeve 7.

The flanged sleeve 7 is sealed to the shoulder 5 and to the cylindrical portion 6 of the glass metal seal 1.

The end of the lead 2 is flattened and tinned and one tinned surface of a crystal die 8 is soldered thereto. A tinned copper annulus 9 carrying a metal tongue or thin narrow strip 10 is soldered to the sleeve 7 and the free end of the tongue 10 is soldered to the other tinned side of the crystal die 8, the two tinned sides of the crystal being opposite to one another and having a P–N junction therebetween.

A cylindrical brass cover 11 is now placed over the crystal and is soldered by induction heating to the annulus 9 in an inert atmosphere, for instance of forming gas (90% $N_2$; 10% $H_2$). The cover 11 may have a glass end 12 in the case of a light cell so that light can be directed on the P–N junction on the edge of the dice. In the case of a rectifier the end of the cover will be of brass carrying a terminal.

Screw terminals may be provided on the lead 2 and on the annulus 9 or the cover 11.

While the principles of the invention have been described above in connection with specific embodiments, and particular modifications thereof, it is to be clearly understood that this description is made only by way of example and not as a limitation on the scope of the invention.

What I claim is:

1. A semi-conductor junction-type cell comprising a container having an inert atmosphere, an insulating seal at one end of the container, a pair of leads sealed to said insulating seal and extending within said container, a junction-type semi-conductor die mounted between the two leads inside the container, and a transparent window in said container at a point spaced from said insulating seal in a position to permit external light to fall upon the die.

2. A cell according to claim 1 wherein said container is metallic, one of said leads being electrically connected to said container, and said seal is glass.

3. A cell according to claim 1 wherein the die is mounted at the inner end of both leads with said die having a P-zone and an N-zone, one lead making contact with the P-zone and the other lead making contact with the N-zone.

References Cited in the file of this patent

UNITED STATES PATENTS

| | | |
|---|---|---|
| 755,840 | Bose | Mar. 29, 1904 |
| 2,705,768 | Kleimack et al. | Apr. 5, 1955 |